United States Patent
Ernst et al.

(10) Patent No.: US 6,231,630 B1
(45) Date of Patent: May 15, 2001

(54) AIR FILTER

(75) Inventors: Volker Ernst, Sachsenheim; Rudolf Leipelt, Marbach, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/254,952

(22) PCT Filed: Sep. 15, 1997

(86) PCT No.: PCT/EP97/05044

§ 371 Date: Jan. 12, 2000

§ 102(e) Date: Jan. 12, 2000

(87) PCT Pub. No.: WO98/12430

PCT Pub. Date: Mar. 26, 1998

(30) Foreign Application Priority Data

Sep. 21, 1996 (DE) .............................................. 196 38 790

(51) Int. Cl.⁷ .................................................. B01D 46/42
(52) U.S. Cl. ............................ 55/385.3; 55/481; 55/493; 55/502
(58) Field of Search ............................. 55/481, 493, 497, 55/498, 499, 502, 521, 385.3; 123/198 E

(56) References Cited

U.S. PATENT DOCUMENTS

| | | | |
|---|---|---|---|
| 4,925,469 | * 5/1990 | Clement et al. ........................ | 55/493 |
| 5,569,311 | * 10/1996 | Oda et al. ............................... | 55/493 |
| 5,640,937 | * 6/1997 | Slopsema ............................ | 55/385.3 |
| 5,649,986 | * 7/1997 | Mueller ................................ | 55/385.3 |
| 5,730,768 | * 3/1998 | Kaminaga et al. .................... | 55/493 |

FOREIGN PATENT DOCUMENTS

| | | | |
|---|---|---|---|
| 839280 | * 5/1952 | (DE) ........................................ | 55/493 |
| 3118413 | * 11/1982 | (DE) ....................................... | 55/493 |

* cited by examiner

Primary Examiner—David A. Simmons
Assistant Examiner—Minh-Chau T. Pham
(74) Attorney, Agent, or Firm—Evenson, McKeown, Edwards & Lenahan, P.L.L.C.

(57) ABSTRACT

An air filter, especially for the intake air of an internal combustion engine, including a housing (10) with a filter insert (17). The housing includes a raw air inlet (11) and a clean air outlet (12), as well as an opening (13) for introduction of the filter insert (17). The filter insert (17) is included of a supporting element (18) and a filter element (19) and can be positioned in contact with a sealing surface with a sealing element or gasket (15) interposed therebetween. The housing (10) includes a supporting element (16) for the filter insert (17), and the filter insert (17) can rock or pivot relative to the supporting element (16) and reaches its final position through such a pivoting or swiveling movement.

10 Claims, 3 Drawing Sheets

AIR FILTER

BACKGROUND OF THE INVENTION

The invention relates to an air filter, especially an air intake filter for internal combustion engines.

U.S. Pat. No. 4,006,000 discloses an air filter for filtering intake air, with a substantially cylindrical housing which has a raw air inlet that is arranged tangentially on the housing, and in this housing is a filter insert through which air flows radially.

The housing itself can be attached with a bayonet lock to a cylindrical air intake collector. In this intake air collector is a safety cartridge which is intended to prevent the entry of dust and dirt into the air intake connection when the filter insert is changed.

A seal is created between the safety cartridge and the filter insert because, after the bayonet lock is engaged, the filter insert is axially displaced toward the safety cartridge, through which the end face of the filter insert comes in contact with the end face of the safety cartridge.

This axial displacement is performed with an adjusting screw disposed on the end wall of the housing, which exerts an axial movement on the end plate of the filter insert.

A disadvantage of this known device is that a very large free space must be present around the housing for the insertion and removal of the filter insert.

Initially, in order to release the bayonet lock, a certain axial movement must be possible. On the other hand, the necessary rotation of the adjusting screw for the axial displacement of the filter insert is possible only if sufficient space is provided in the vicinity of this adjusting screw for manual access to it. This type of construction of an air intake filter is therefore unsuitable where space is restricted.

German Patent 39 18 347, (corresponding to U.S. Pat. No. 5,042,999) discloses an air intake filter for an internal combustion engine, in which only a short axial movement of the housing is necessary for installation and removal. For this purpose a filter pot is provided which is inserted into a sliding shoe and can be fastened by means of a tilting movement to a part that receives it.

Although exchanging the filter element is possible here within very limited space, there exists the danger that, in case of shaking or vibration the housing may undergo resonance vibrations, and sealing problems may occur.

SUMMARY OF THE INVENTION

The invention is therefore based on the object of avoiding the aforementioned disadvantages and providing a compact filter arrangement which with little surrounding free space and a small space requirement will assure reliable particle separation.

This object is achieved by the invention as described hereinafter.

The substantial advantage of the invention is to be seen in the fact that the filter element, which is usually a rectangular element and requires a relatively large space for insertion and removal, can be inserted into the housing with a rocking motion and only a minimum of space is needed for insertion and removal.

It is advantageous to construct the filter insert of a supporting element and a filter element. In this way it is possible to dispose of the filter element, which essentially is comprised of a zig-zag folded filter paper and a gasket, without any difficulty, while the supporting element can be used repeatedly.

According to one embodiment of the invention, an abutment element on the housing is equipped with a glide track. This glide track simultaneously is the corner point for the filter insert and is a kind of hollow throat which accommodates an axis of rotation of the filter insert.

Another advantageous embodiment of the invention envisions providing the housing with a hinged cover. This cover closes off the raw air chamber of the housing and prevents the penetration of dirt or unwanted air.

In an alternative embodiment the cover can be directly connected to the filter insert. Thus the number of components is reduced even further and the insertion and removal of the filter insert or filter element is made even simpler.

According to a further embodiment the cover or filter insert is provided with a catch or snap fastener in order to produce a reliable and easy-to-operate attachment to the housing.

As already mentioned, the filter element is comprised of a zig-zag folded filter material, a paper filter material or a nonwoven material, in which case an elaborate construction is unnecessary, and all that needs to be provided is a circumferential gasket on the filter element.

These and other features of preferred embodiments of the invention are found not only in the claims but also in the description and the drawings, it being possible for the individual features to be realized individually or together in the form of subcombinations in embodiments of the invention and in other fields, and may represent advantageous as well as independently patentable embodiments, for which protection is hereby claimed.

BRIEF DESCRIPTION OF THE DRAWINGS

The invention will be described hereinafter with reference to embodiments. The drawings show.

DESCRIPTION OF PREFERRED EMBODIMENTS

Figure 1:
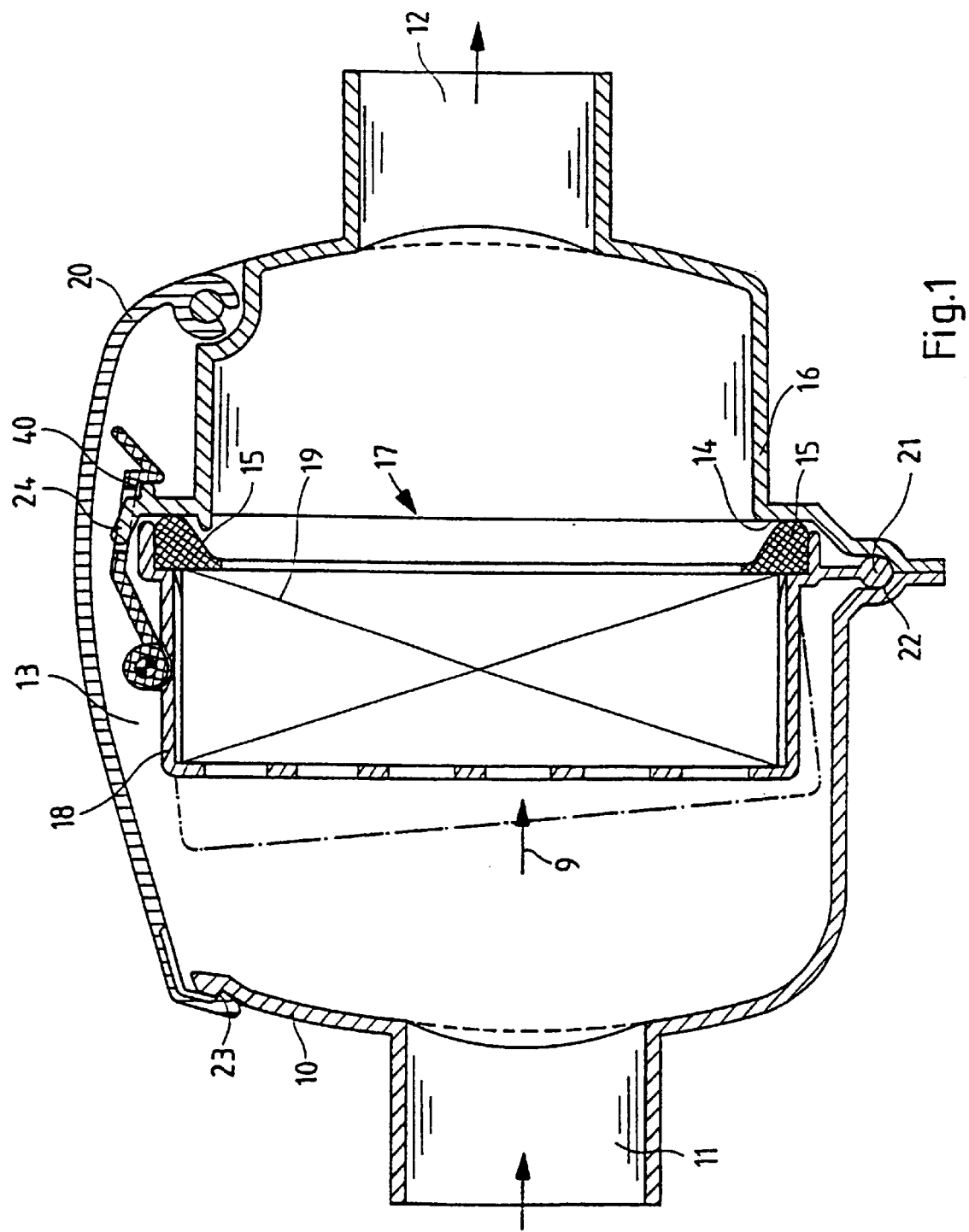
FIG. 1 a sectional view of an air filter with filter element installed.

The air filter according to FIG. 1 comprises a housing 10 which is provided with a raw air inlet 11 and a clean air outlet 12. In the upper area the housing 10 has an opening 13 which is closed with a cover 20. In the housing is an abutment element 16 with a sealing surface 14. This sealing surface 14 corresponds to a sealing element 15 which is disposed on the filter insert 17. The filter insert 17 is comprised of a supporting element 18 and a filter element 19. The filter insert 17 is provided at the bottom end with a pivot 21 which together with the pivot socket 22 in housing 10 forms a hinge. The air introduced through the raw air inlet passes in accordance with arrow 9 through the filter element 19 and after cleaning leaves the air filter through the clean air outlet 12. The air filter is particularly suitable for the air intake of an internal combustion engine and is advantageously arranged in the engine compartment of a motor vehicle or in the immediate vicinity of an internal combustion engine. In order to replace the filter element 19 the cover 20, which is attached to the housing by a catch or snap connection 23, is opened. Then a bow-clamp 40 arranged on the filter insert 17 is released, the filter insert 17 is pivoted to the left to the position shown in broken lines and removed upwardly. The pivoting movement is necessary so that the sealing element 15 is separated from the abutment element 16, and no shearing forces can be exerted on the gasket during insertion or during removal of the filter element 19. To prevent the insertion of a new filter insert an edge 24 is provided along the sealing surface 14. This edge permits the sealing element 15 to move into contact with the sealing surface 14 only if the filter insert 17 is in the bottom position, that is, when the pivot 21 is already in the pivot socket 22.

Figure 2:
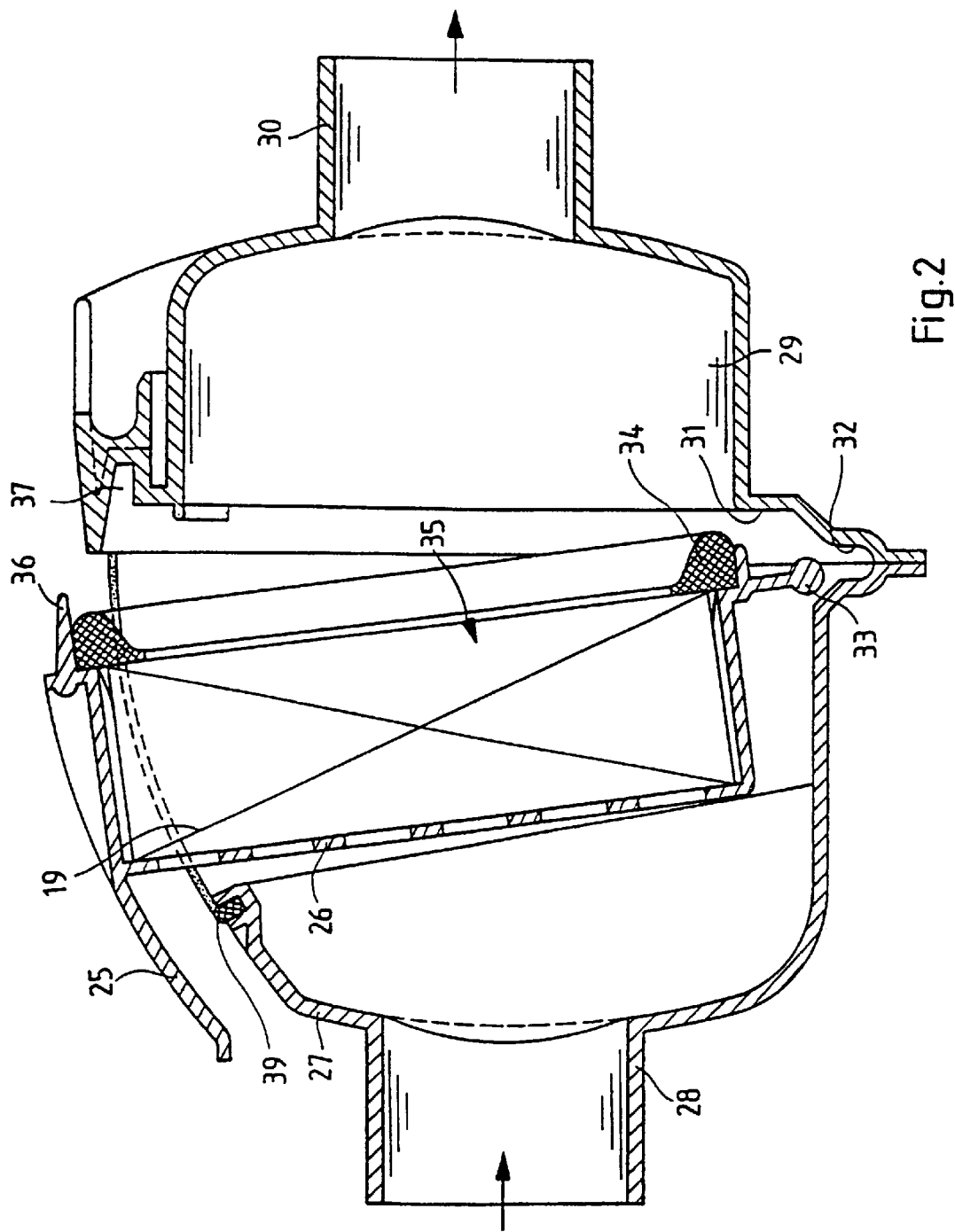
FIG. 2 a variant of an air filter in the open position.

FIG. 2 shows a variant of an air filter in which a cover 25 is already integrated on the filter insert 26. This has the advantage that, when the cover is opened, the filter insert 26 is simultaneously pivoted and thereafter needs only to be removed. The filter insert 26 is disposed in the housing 27 with raw air inlet 28. In the clean air area 29 of the housing is a sealing surface 31. The housing is provided with a glide track 32. The filter insert 26 is inserted from above with its mounting element 33 in the glide track 32 and then pivoted into the end position, that is to say, into the position in which the sealing element 34 bears against the sealing surface 31. Sealing element 34 and filter element 35 form a unit which can be removed from the filter insert 26.

Figure 3:
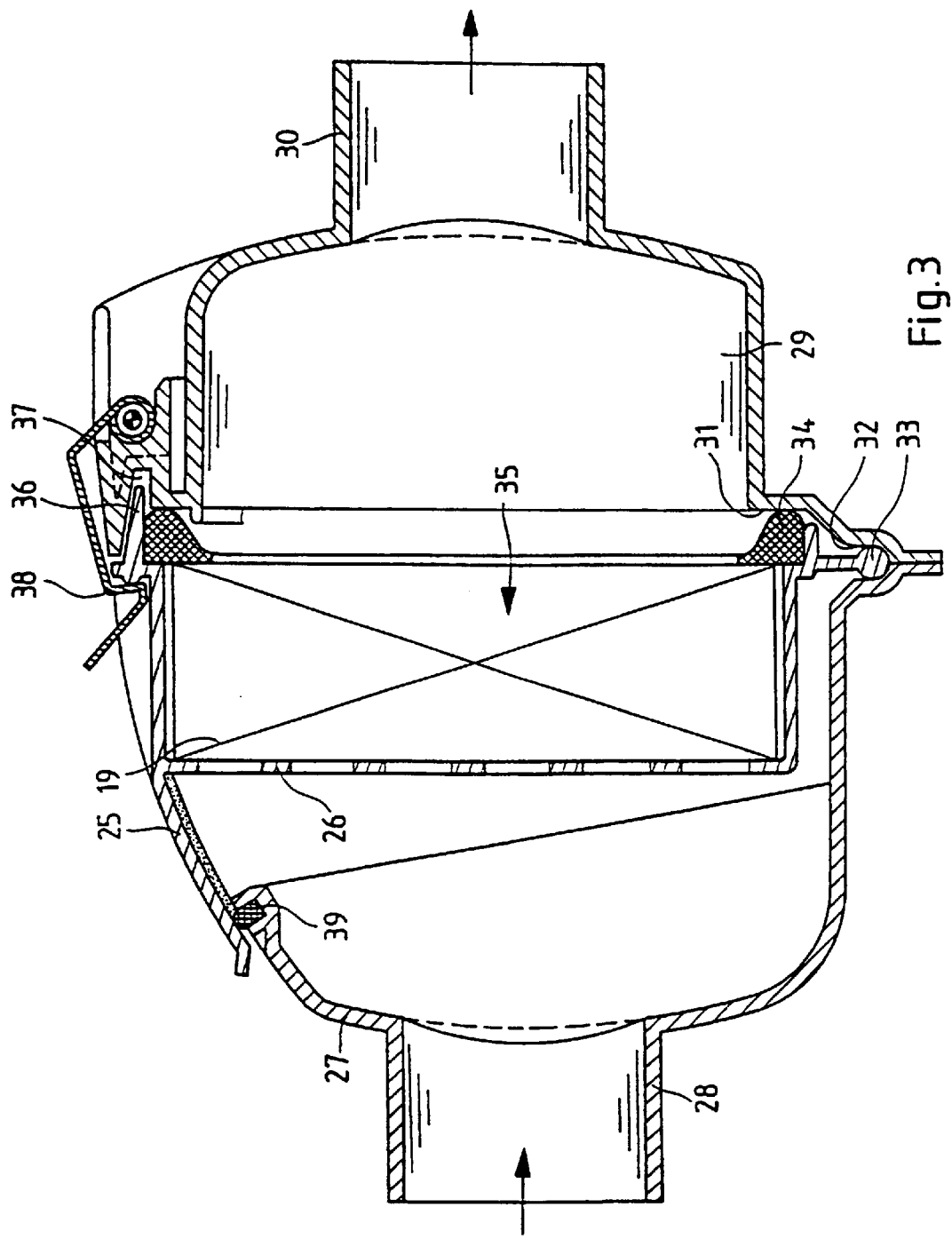
FIG. 3 the variant shown in FIG. 2, in the closed position.

FIG. 3 shows the closed position of the air filter shown in FIG. 2. Corresponding parts are provided with the same reference numbers. A lip 36 of the cover 25 engages a groove 37 in the housing. The closing of the cover on the housing is accomplished by a catch or, as shown here, by a spring clip 38. At the left end of the cover and on the two sides, not shown here, the cover lies upon a circumferential seal 39 of the housing and thus seals the raw air chamber against the entry of unwanted air. The filter element 35 is configured as a holder for the filter insert 26 and can be exchanged without difficulty.

What is claimed is:

1. An air filter arrangement comprising:

a housing and a filter insert arranged in said housing;

said filter insert comprising a supporting element and a filter element;

said housing having an air inlet, an air outlet, and an opening for introduction of the filter insert into the housing, and said housing comprising an abutment element having a sealing surface thereon;

wherein said filter insert is provided with a pivot received in a pivot socket in said housing, said pivot and pivot socket together forming a hinge about which said filter insert is pivotable to an end position in which said filter insert is positioned against said sealing surface with a gasket sealingly interposed between the filter insert and the sealing surface.

2. An air filter arrangement according to claim 1, wherein said air filter is disposed in an air intake of an internal combustion engine.

3. An air filter arrangement according to claim 1, wherein said housing is provided with a hinged cover which closes the opening for introduction of the filter element into the housing.

4. An air filter arrangement according to claim 1, wherein the filter insert is provided with an attached cover which closes the opening for introduction of the filter element into the housing.

5. An air filter arrangement according to claim 1, further comprising a clamp for holding the filter insert against the sealing surface.

6. An air filter arrangement according to claim 3, further comprising a catch for holding said hinged cover in a closed position.

7. An air filter arrangement according to claim 4, further comprising a clamp for holding the filter insert against the sealing surface with said attached cover in a closed position.

8. An air filter arrangement according to claim 1, wherein said filter element is a zig-zag folded flat filter with a circumferential gasket.

9. An air filter arrangement according to claim 1, wherein the pivot socket in said housing is formed by a pair of concavities in walls of the housing, and the pivot of the filter insert is in pivotable contact with the pair of concavities.

10. An air filter arrangement according to claim 9, wherein the pivot socket forms a groove having an axis which is concentric with a pivot axis of the pivot of the filter insert.

* * * * *